(12) United States Patent
Wilkes et al.

(10) Patent No.: US 9,096,258 B2
(45) Date of Patent: Aug. 4, 2015

(54) GEARBOX ASSEMBLY FOR ELECTRIC POWER STEERING SYSTEMS

(75) Inventors: Mark Anthony Wilkes, Birmingham (GB); Guillaume Laudijois, Birmingham (GB)

(73) Assignee: TRW Automotive U.S. LLC, Livonia, MI (US)

( * ) Notice: Subject to any disclaimer, the term of this patent is extended or adjusted under 35 U.S.C. 154(b) by 689 days.

(21) Appl. No.: 13/260,626

(22) PCT Filed: Mar. 24, 2010

(86) PCT No.: PCT/GB2010/050492
§ 371 (c)(1),
(2), (4) Date: Dec. 12, 2011

(87) PCT Pub. No.: WO2010/109232
PCT Pub. Date: Sep. 30, 2010

(65) Prior Publication Data
US 2012/0103129 A1 May 3, 2012

(30) Foreign Application Priority Data

Mar. 27, 2009 (GB) .................................. 0905294.5

(51) Int. Cl.
*F16H 1/16* (2006.01)
*B62D 1/16* (2006.01)
(Continued)

(52) U.S. Cl.
CPC ................ *B62D 1/16* (2013.01); *B62D 5/0409* (2013.01); *F16D 3/387* (2013.01)

(58) Field of Classification Search
CPC ......... F16H 1/16; F16H 57/039; F16H 55/22; B62D 1/192; B62D 1/195; B62D 1/16; B62D 5/0409; B62D 5/00; B62D 3/385

USPC ............ 74/425, 492, 493, 500; 180/444, 424, 180/448

See application file for complete search history.

(56) References Cited

U.S. PATENT DOCUMENTS 5,749,786 A * 5/1998 Pattok ........................... 464/106
6,076,628 A * 6/2000 Pattok et al. ................... 180/444
(Continued)

FOREIGN PATENT DOCUMENTS

DE            19856830 A1      6/1999

OTHER PUBLICATIONS

International Search Report completed Aug. 26, 2010 for PCT/GB2010/050492.

*Primary Examiner* — William Kelleher
*Assistant Examiner* — Jude Agendia
(74) *Attorney, Agent, or Firm* — MacMillan, Sobanski & Todd, LLC

(57) ABSTRACT

A gearbox assembly for an electric power assisted steering assembly comprises a gearbox housing (20), an output shaft (23), a wheel gear assembly (22) comprising a hub (21) which is fixed to the output shaft by a locating means so as to prevent relative rotational and axial movement between the hub and the output shaft and a gear wheel fixed to the hub, at least one support bearing assembly (25,26) which supports the output shaft relative to the gearbox housing (20), a worm gear which engages the wheel gear (22), and a coupling for transmission of torque from the output shaft to an intermediate shaft that is external to the gearbox housing. The coupling includes a fixing part (31) which is fixed to the output shaft (23) through the gear assembly and the support bearing assembly is provided on the opposite side of the gear assembly (22) to the coupling (31) such that the gear assembly (22) is overhung from the portion of the output shaft supported by the bearings (25,26).

20 Claims, 5 Drawing Sheets

(51) Int. Cl.
*B62D 5/04* (2006.01)
*F16D 3/38* (2006.01)

(56) References Cited

U.S. PATENT DOCUMENTS

| | | | |
|---|---|---|---|
| 6,354,395 B1 * | 3/2002 | Cheng et al. | 180/444 |
| 6,378,647 B1 * | 4/2002 | Birsching et al. | 180/444 |
| 6,805,017 B2 * | 10/2004 | Chikaraishi et al. | 74/388 PS |
| 7,654,360 B2 * | 2/2010 | Saito et al. | 180/444 |
| 2004/0163879 A1 * | 8/2004 | Segawa | 180/444 |
| 2006/0034650 A1 * | 2/2006 | Appleyard et al. | 403/14 |
| 2009/0266640 A1 * | 10/2009 | Oshima et al. | 180/444 |

* cited by examiner

GEARBOX ASSEMBLY FOR ELECTRIC POWER STEERING SYSTEMS

CROSS-REFERENCE TO RELATED APPLICATIONS

This application is the National Phase of International Application PCT/GB2010/050492 filed Mar. 24, 2010, which designated the U.S. That International Application was published in English under PCT Article 21(2) on Sep. 30, 2010 as International Publication Number WO 2010/109232A1. PCT/GB2010/050492 claims priority to U.K. Application No. 0905294.5 filed Mar. 27, 2009. Thus, the subject nonprovisional application also claims priority to U.K. Application No. 0905294.5 filed Mar. 27, 2009. The disclosures of both applications are incorporated herein by reference.

This invention relates to improvements in gearbox assemblies for use in an electric power assisted steering system.

Electric power assisted steering systems of the kind in which a motor is connected to a part of the steering system through a reduction gearbox are well known. The motor can be operated to apply an assistance torque to the steering system which can help the driver to turn the wheel during normal driving. The motor can also be used to apply a torque of the same sense or of an opposite sense to that applied by the driver or passed back from the road wheels of the vehicle in order to provide other forms of driver assistance during abnormal operating conditions.

All currently mass-produced column drive (CD-EPS) systems use a worm-and-wheel type of motor-speed reduction gearbox. The worm-wheel may either be supported by one ball bearing on each side or it may be "overhung" from a pair of adjacent ball bearings which are spaced apart by several millimeters. An example of such a prior art gearbox is shown in FIG. 1 of the accompanying drawings for a column drive type steering system. The gearwheel (2) is attached to an end part of an output shaft (3), which in the example forms part of a steering shaft operatively connected to a steering wheel. The motor (4) is connected to the worm wheel (2) through a worm gear and both the worm and wheel are contained within a housing (1). This housing also, conveniently, provides a location for a torque sensor (5) which is used as part of the control circuit for the motor (4). The wheel gear (2) is splined to the shaft (3) and is supported on either side by bearings (7, 8) which support the output shaft (3) relative to the gearbox housing (1).

The output shaft free end carries a detachable upper yoke (9) which is a splined fit to the end of the output shaft (3) and has a split collar which is compressed over the splined shaft portion, or an alternatively profiled shaft, by a high-tensile pinch bolt. The upper yoke and output shaft therefore form one half of a Cardan joint, the other half being carried by an intermediate shaft, otherwise known as an I-shaft, which is connected to the output shaft for onwards transmission of torque to the roadwheels of the vehicle.

For a given overall column length and a given set of reach-adjustment and crash-collapse requirements, the Guide Length of the column is reduced by around 55 to 85 mm when a column-mounted Electric Power Steering device is installed compared with a non-assisted assembly. This can often mean a reduction in Guide Length of the order of 50%. The effect is to make it difficult, in many instances, to devise upper steering column designs which have the desired stiffness, ease of adjustment and consistency in their collapse forces. The prior art form of attachment of the upper yoke contributes to this reduction.

According to a first aspect the invention provides a gearbox assembly for an electric power assisted steering assembly which comprises:

a gearbox housing, an output shaft, a wheel gear assembly comprising a hub which is fixed to the output shaft by a locating means so as to prevent relative rotational and axial movement between the hub and the output shaft and a gear wheel fixed to the hub, at least one support bearing assembly which support the output shaft relative to the gearbox housing, a worm gear which engages the wheel gear, and a coupling for transmission of torque from the output shaft to an intermediate shaft that is external to the gearbox housing;

characterised in that:

the coupling includes a fixing part which is fixed to the output shaft through the gear assembly and the support bearing assembly is provided on the opposite side of the gear assembly to the coupling such that the gear assembly is overhung from the portion of the output shaft supported by the bearings.

By overhanging the gearbox from the bearing assembly located on the "input" side of a gear assembly the applicant has appreciated that access to the end face of the gear hub on the "output" side is provided which permits the coupling to be connected directly to the gear hub rather than directly to the end of the output shaft using a splined coupling as is known in the prior art. The overall length of the gearbox can therefore be reduced.

The support bearing assembly may comprise two bearings spaced apart along the axis of the output shaft, both on the input side of the gearbox. It may comprise only one bearing such as a so-called 4-point contact angular ball bearing or, alternatively, a significantly larger deep-groove ball bearing. In either case, it is preferred that the output shaft is not supported at all by any bearing assembly on the output side of the gearbox, i.e. the side of the hub to which the coupling is fastened.

The fixing part of the coupling may comprise a flange which abuts the gear assembly, and preferably abuts an end face of the gear hub on the output side of the gearbox.

The overall length reduction is slightly compromised by the need to have some unoccupied space between the Worm-Wheel support bearings which is, in effect, "wasted" length. Increasingly, the said unoccupied space reduces the radial forces acting on the bearings which are due to shaft bending-moments. These bending moments partly derive from the effects of the helix angle of the gear teeth and partly derive from the kinematics of any coupling used. The axial length of the said unoccupied space is much less than the reduction in overall length brought about by using the flanged coupling, directly driven from the Worm-Wheel.

An additional advantage of the overhung Worm-Wheel gear assembly is that the Output Bearing Carrier which is shown in the Prior Art case in FIG. 1 is no longer necessary.

The open end of the gearbox housing on the coupling side of the gear assembly may be covered by a cover which co-operates with the gear hub and/or the gearbox housing. This helps to retain the grease, where provided inside. The cover may be a light metal pressing. The sealing between the pressing and the gear wheel hub can either rely on having a small clearance with some labyrinthine geometry or may, alternatively, use a flexible rubbing seal.

The coupling flange may be attached directly to the hub of the EPS Worm-Wheel via one or more fasteners, such as screws, typically four.

The coupling may comprise an upper yoke which forms part of a Cardan shaft connection. Of course, other forms of coupling may be provided within the scope of the invention, such as a constant velocity joint.

The coupling may form an integral part of the intermediate shaft, a so called I-shaft. The complete I shaft may therefore form an integral part of the gearbox assembly.

The locating means by which the worm gear hub is fixed to the output shaft may comprise an interaction between part of the hub gear and part of the output shaft. For instance a bore may be provided through a central region of the hub gear which is a heavy press fit onto a portion of the output shaft.

Additionally, or in the alternative, the locating means may include spline teeth which are incorporated into either or both of the connecting surfaces of the hub gear and output shaft. For instance, the outside diameter of the shaft could have a "fine-tooth" spline form comprising a large number of small ridges extending axially over a part or the whole of the interface between the Worm-Wheel and the Output Shaft.

The fine tooth spline could be economically produced by a rolling process. The internal bore of the Worm-Wheel could be plain but have a diameter slightly smaller than the diameter of an imaginary circle enveloping the tips of the male spline on the shaft.

Alternately, the shaft could be made plain and spline teeth could be incorporated into the bore of the Worm-Wheel instead. In a further arrangement, matching spline teeth can be incorporated into both surfaces and designed so that they require a heavy press-fit for assembly by virtue of having interference between them.

The wheel hub may be fixed to the shaft so as to provide a combination of at least 400 Nm minimum rotational slip torque and at least 8 kN minimum axial slip force.

In a preferred arrangement a secondary locating means is provided which ensures that in the event of at least one type of failure of the connection between the hub and the output shaft the flanged coupling cannot rotate or move axially relative to the output shaft.

The applicant has appreciated that a "Disconnected Steering" occurrence in service would be unacceptable, and has appreciated that it is possible to provide secondary retention means for securing the Worm-Wheel hub to the output shaft, both axially and rotationally, in the event that the press-fit between them would fail in either mode.

To provide rotational security, the secondary locating means may comprise a portion of the output shaft which has a non-round, for example square, profile in cross section which co-operates with corresponding non-round, for example square, hole formed in the centre of the flange. This ensures that the flange cannot rotate relative to the output shaft, thus preventing the flange from rotating even if the hub gear is free to rotate. The effect is to ensure that the output and output shafts remain rotationally locked to permit torque to pass from one to the other at all times.

To provide an axial security a circlip may be provided which fits at least partially within a groove provided in the non-round part of the shaft and which prevents the Worm-Wheel from sliding off the shaft in the event that the fixing between hub and shaft fails.

Where the non-round part of the shaft has a square or polygonal section, the circlip may fit into one or more grooves that are provided in each corner of the shaft section. In order to ensure that relatively deep grooves can be employed in the shaft to provide a secure retention of the circlip, and to further aid security by having a solid clip rather than a split device, the circlip may be designed to be slid over the non-round, e.g. square, profile during assembly until it is level with the groove and then rotated into engagement in the manner of a "bayonet" fitting.

Where the circlip is rotated into position it may be prevented from rotating out of its installed position by one or more flexible fingers radiating from the periphery of the circlip which are arranged so as to engage with depressions formed in the adjacent side of the Worm-Wheel Hub into which they snap-fit on assembly and out of which they are prevented from subsequently disengaging by the presence of the flange once it is fixed to the hub.

In an alternative arrangement the rotational and axial back-up features may be combined into one component which resembles a grub screw and which engages with a hole half-formed as a semi-circular depression in the outside circumference of the output Shaft and half-formed as a semi-circular depression in the inside circumference of the gear hub. The former semi-circular depression having a thread form matching that of the grub screw while the latter semi-circular depression is plain.

The grub screw may be provided with a non-round head, such as a rectangular extension, at its accessible end which provides a means for screwing it into position in the half-threaded hole which is created by the two said semi-circular depressions. The non-round head may then engage with a slot in the circumference of the inner bore of the flange once the latter is fixed in position against the Worm-Wheel hub such that the interaction between the slot and the head prevents further rotation of the grub screw.

The grub screw is thereby prevented from rotating and therefore can not move along the threaded semi-circular depression in the outside circumference of the Output Shaft.

In use the non-accessible end of the grub screw may be located adjacent to an end wall of the semi-circular depression in the inside circumference of the hub and therefore prevents the hub from slipping along the shaft by more than a fraction of a millimeter. In this manner the grub screw retains the hub on the shaft both rotationally and axially in the event that the press-fit between the hub and the shaft should fail and initiate some slip.

There will now be described, by way of example only, three embodiments of the present invention with reference to and as illustrated in the accompanying drawings of which:

Figure 1:
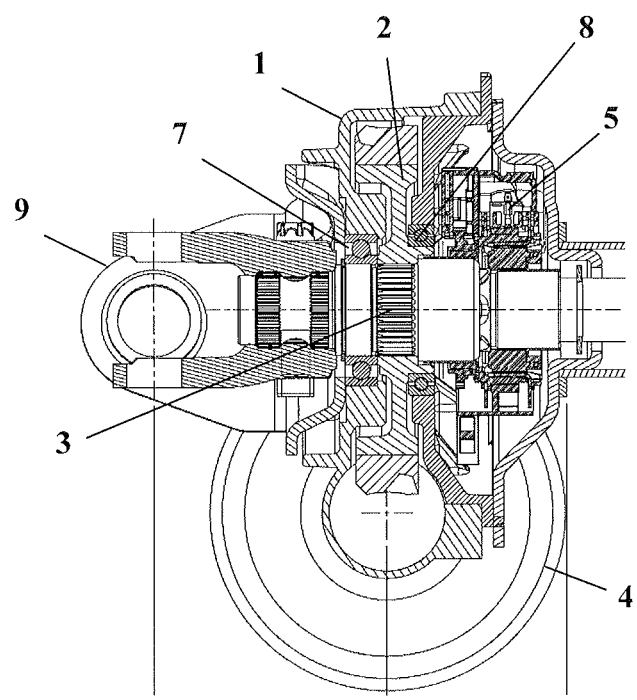
FIG. 1 is shows the cross-section through the worm-wheel axis for a typical prior art Column-Drive EPS gearbox.
Figure 2A:
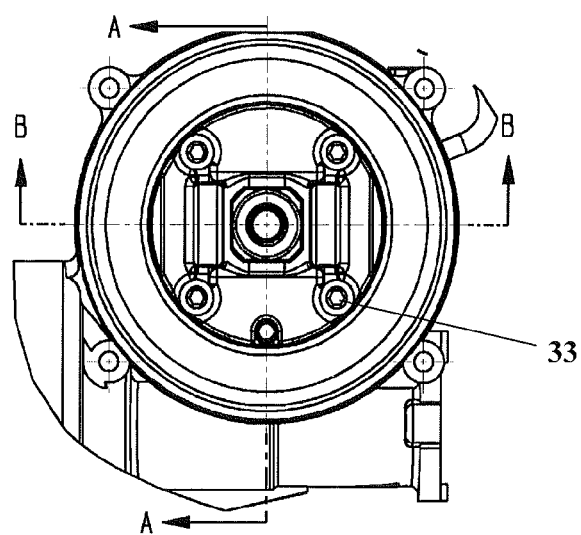
FIG. 2 is a first embodiment of a gearbox assembly according to the present invention but omitting to show an I-shaft which forms part of the gearbox assembly.
Figure 2B:
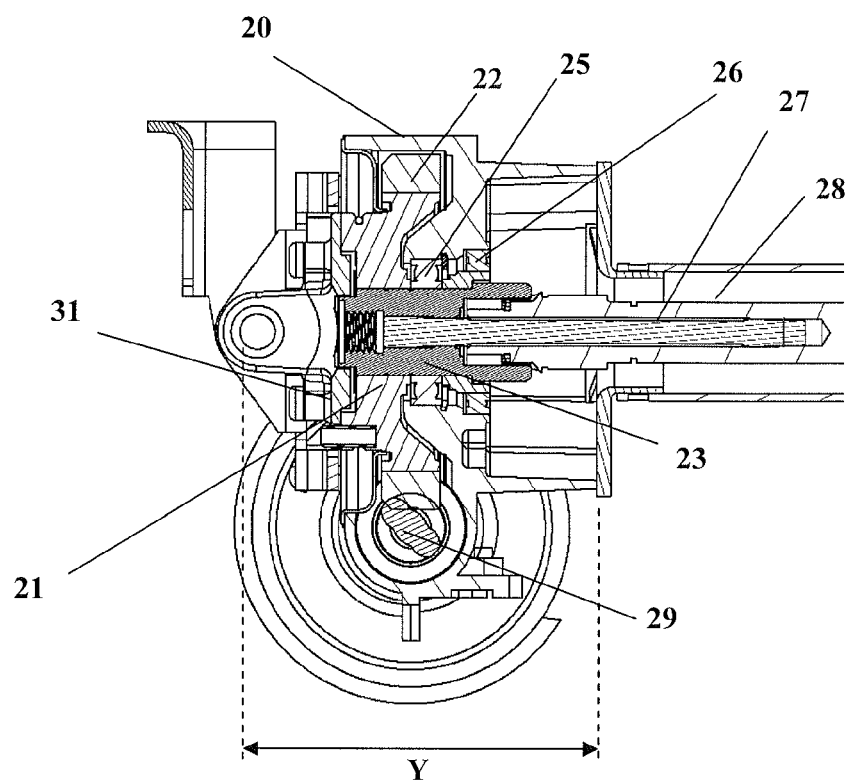

As shown in FIG. 2, an embodiment of an electric power assisted steering assembly in accordance with the present invention comprises a gearbox housing (20) within which is located an output shaft (23). The output shaft (23) is connected to an input shaft (28) by an optional quill shaft (27) that is located within a bore in the output shaft and a bore in the input shaft on an "input" side of the gearbox housing (the right side as shown in FIG. 2) The input shaft (28) forms part of a steering column and is operatively connected to a steering wheel of a vehicle. The quill shaft (27) is provided to increase the amount of rotation between the input and output shafts as the driver applies torque to the input shaft. This rotation is then detected by a torque sensor (not shown) located within the gearbox housing (20) on the input side used as part of the control circuit for an electric motor (also not shown).

Figure 3A:
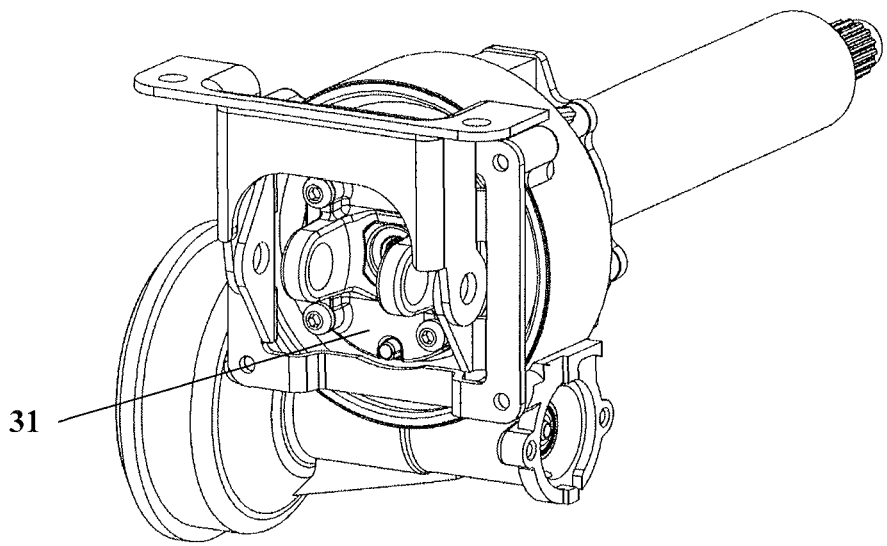
FIG. 3 is an illustration of the complete I-Shaft, with flanged upper yoke, separated from the EPS Gearbox for clarity.
Figure 3B:
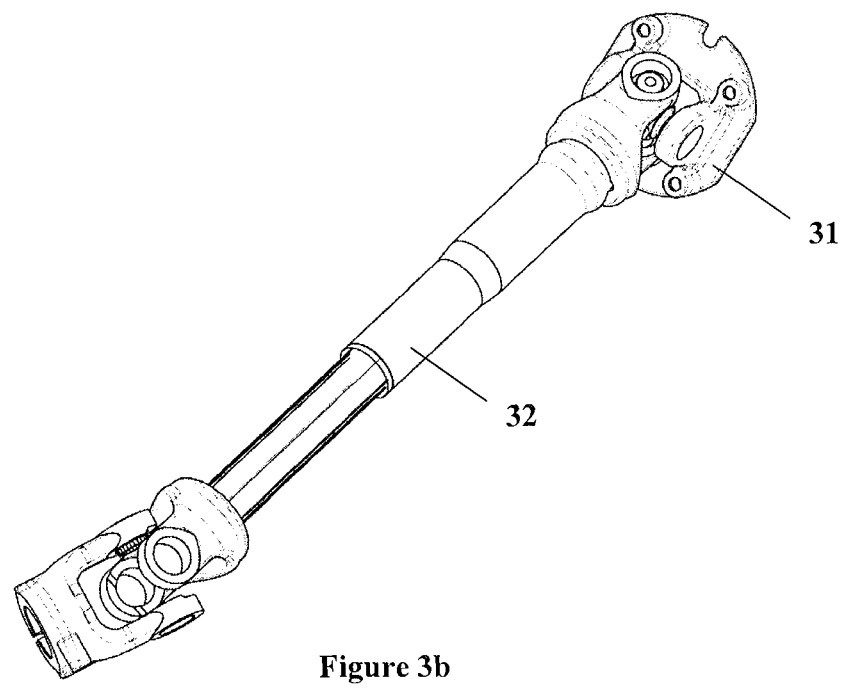

As well as connecting to an input shaft on an "input" side of the gearbox, the output shaft (23) also forms a take off point for the transfer of torque out from the gearbox on an "output" side of the gearbox shown to the left in the Figure. The output shaft is operatively connected to the roadwheels of the vehicle via an intermediate I-shaft (32) shown in FIG. 3. The manner in which the output shaft and the I-shaft shaft are connected is described hereinafter.

With the housing is a worm and wheel gearbox. The wheel forms part of a wheel gear assembly (22) and is fixed to a wheel gear assembly comprising a hub (21) which is fixed to the output shaft (23) by a locating means so as to prevent relative rotational and axial movement between the hub (21) and the output shaft (23) and a gear wheel (22) fixed to the hub. The locating means takes the form of a heavy press fit of the hub to the shaft.

The worm (29) forms part of a motor drive shaft which extends through the gearbox at right angles and offset from the output shaft so that the worm and wheel gear teeth mesh. The motor drive shaft is arranged such that it can be connected to a motor (not shown), rotation of the motor causing the worm to rotate and it turn the wheel and hence the output shaft. The worm shaft is supported relative to the gearbox housing (20) by bearings (not shown).

The output shaft (23) is supported with the gearbox housing (20) by a pair of bearing races (25, 26) which are spaced apart by a small distance. Each comprises an inner bearing race fixed to the output shaft, and outer race journalled to the gearbox housing, and a set of ball bearings between the inner and outer races. One of the bearings could be of the needle or roller type. Both bearings are provided on the input side of the gear assembly such that the gear assembly is overhung, eg it is supported on the free end of the output shaft that protrudes beyond the bearings on the output side of the gearbox and is not supported by bearings on that output side.

Secured to the gearbox hub on the output side is a flange (31) which forms part of a universal coupling. The flange is fixed to the hub by four screws (33), and the outer yoke fixed to the flange (31) provides half of a Cardan type universal coupling, the other half being secured to an intermediate shaft to which the gearbox is to be connected. Once the Cardan coupling is assemble there is a direct torque transmission path from the output shaft (23) through the coupling, the flange (31) and the gear hub to the I-shaft (32).

As shown in FIG. 2, the locating means for connecting the Worm-Wheel (22) to the Output Shaft (23) comprises a heavy press-fit connection between part of the hub (21) and the shaft (23). Thus, the mechanical connection between the steering wheel and the road wheels relies on this press-fit never slipping in service. Slippage of this connection could result in "Disconnected Steering", which is an unacceptable failure mode. Note that the said press-fit provides both a vital rotational connection and a vital axial connection and the failure of either or both could cause "Disconnected Steering". To improve the capacity of the connection to resist rotational slip, there is an option to incorporate spline teeth into either or both of the connecting surfaces. For instance, the outside diameter of the shaft also has a "fine-tooth" spline form comprising a large number of small ridges extending axially over a part or the whole of the interface between the Worm-Wheel and the Output Shaft. In this embodiment, the spline form and interference fit are chosen, together with the respective hardnesses of the Worm-Wheel and shaft materials, so as to provide a combination of 400 Nm minimum rotational slip torque and 8 kN minimum axial slip force.

Figure 4A:
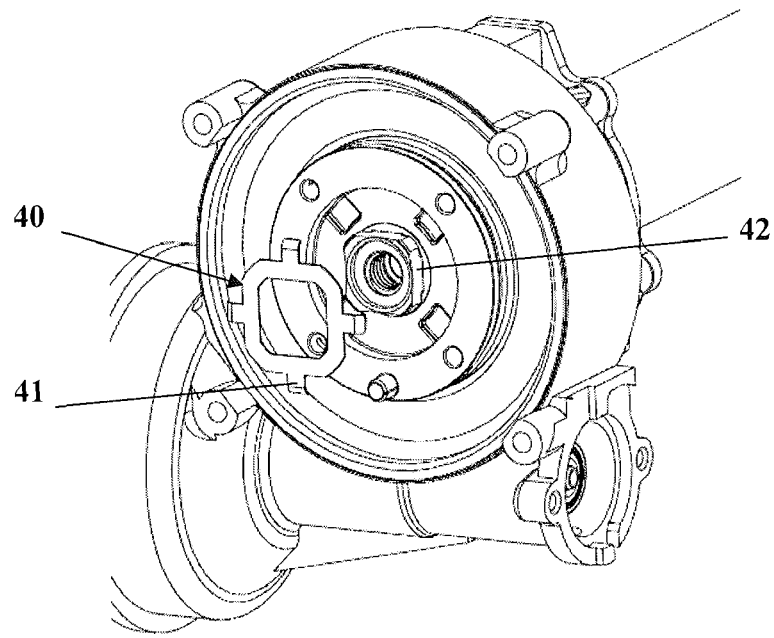
FIG. 4 is an illustration of an enhanced feature whereby an axial and rotational back-up is provided by an additional secondary locating means in the form of a special circlip.
Figure 4B:
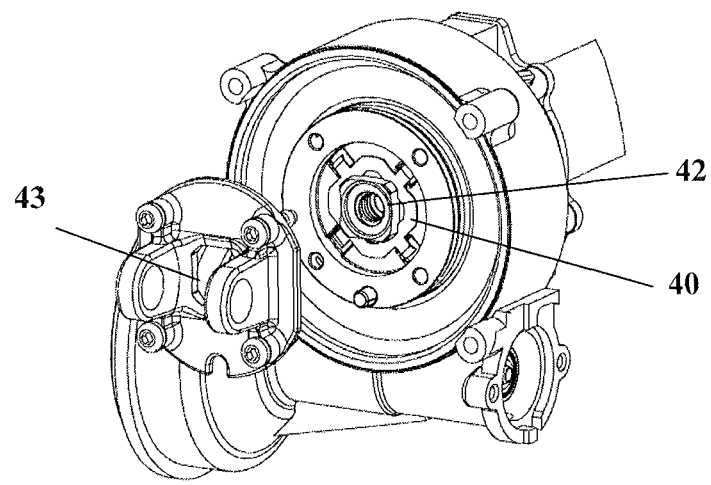

In the modified arrangement of FIG. 4, an additional secondary locating means is provided whereby an additional connection is made between the flanged coupling and the output shaft to ensure they cannot be displaced rotationally or axially in the event that the press fit between the gear hub and the output shaft relaxes or an excessive load is applied.

A rotational back-up is ensured by the engagement of a square profile (42) which is formed at the end of the Output Shaft (23) with a corresponding square hole (43) formed in the centre of the I-Shaft Upper Yoke. It is worth noting that, under normal operation, torque which is transmitted by the press fit of the Worm-Wheel hub on the Output Shaft is only that which is applied by the driver to the Steering Wheel. The assistance torque generated by the electric motor and reduction gears is not transmitted by the said press-fit. This fact enhances the service life expectancy of the secondary retention means, should it be called into play. Occasional sudden angular accelerations of the shafts caused by road wheel impacts, on the other hand, may result in larger levels of torque being briefly applied to the said press-fit due to the inertia of the steering wheel.

In the arrangement shown in FIG. 4, an axial back-up is provided by a special circlip (40) which is fitted into grooves at the corners of the said square part of the shaft and which prevents the Worm-Wheel from sliding off the shaft in the event that the original press-fit relaxes. In order to ensure that relatively deep grooves can be employed in the shaft to provide a secure retention of the circlip (40), and to further aid security by having a solid clip rather than the more usual split device, the special circlip is designed to be slid over the square profile (42) during assembly until it is level with the groove and then rotated into engagement in the manner of a "bayonet" fitting. It is preventing from rotating out of its installed position by the bent-over ends (41) of one or more flexible fingers radiating from the periphery of the circlip (40). These bent-over flexible fingers (41) engage with depressions formed in the adjacent side of the Worm-Wheel Hub into which they snap-fit on assembly and out of which they are prevented from subsequently disengaging by the presence of the Upper Yoke once it is fixed to the hub by, in this example, four screws.

Figure 5A:
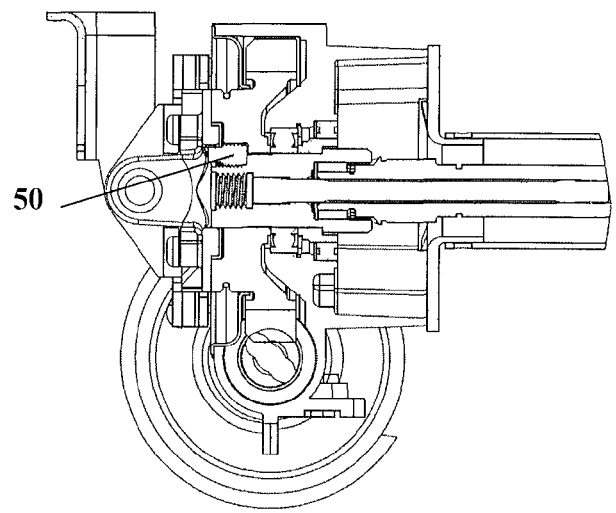
FIG. 5 is an alternative arrangement employing a grub screw as the additional secondary locating means to provide axial and rotational back-up.
Figure 5B:
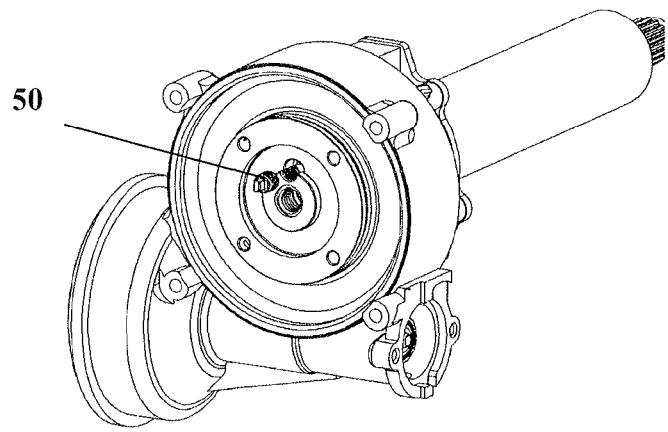
Figure 5C:
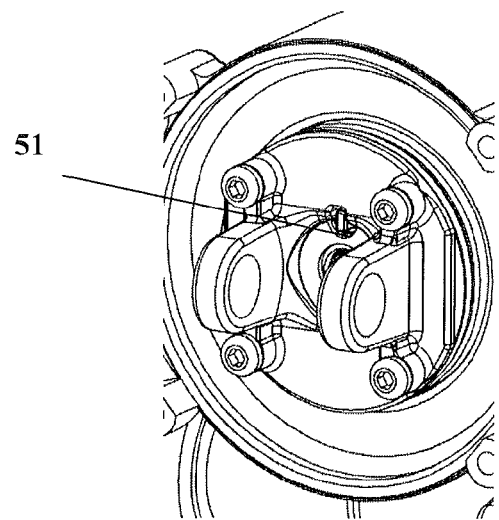

In another embodiment shown in FIG. 5, the rotational and axial back-up features are combined into one component which resembles a grub screw (50) and which engages with a hole half-formed as a semi-circular depression in the outside circumference of the Output Shaft and half-formed as a semi-circular depression in the inside circumference of the hub. The former semi-circular depression has a thread form matching that of the grub screw (50) while the latter semi-circular depression is plain. The grub screw has a rectangular extension at its accessible end which provides a means for screwing it into position in the half-threaded hole which is created by the two said semi-circular depressions.

The rectangular extension of the grub screw (50) engages with a slot (51) in the circumference of the inner bore of flanged yoke once the latter is fixed in position against the Worm-Wheel hub. The grub screw is thereby prevented from rotating and therefore can not move along the threaded semi-circular depression in the outside circumference of the Output Shaft. The non-accessible end of the grub screw is adjacent to the end wall of the semi-circular depression in the inside circumference of the hub and therefore prevents the hub from slipping along the shaft by more than a fraction of a millimeter. It can be seen that the grub screw retains the hub on the shaft both rotationally and axially in the event that the press-fit between the hub and the shaft should fail and initiate some slip.

The invention claimed is:

1. A gearbox assembly for an electric power assisted steering assembly comprising:
    a gearbox housing,
    an output shaft,
    a hub which is fixed to said output shaft so as to prevent relative rotational and axial movement between said hub and said output shaft, said hub having a gear wheel fixed thereto,
    at least one support bearing assembly which supports said output shaft relative to said gearbox housing,
    a worm gear which engages said gear wheel, and
    a coupling including a fixing part which is fixed to said hub for transmission of torque from said output shaft to a shaft that is external to said gearbox housing; wherein:
    said at least one support bearing assembly is provided on an opposite side of said hub from said coupling such that said hub is overhung from a portion of said output shaft supported by said at least one support bearing assembly.

2. A gearbox assembly according to claim 1, wherein said at least one support bearing assembly comprises two bearings spaced apart along an axis of said output shaft, both of said bearings being provided on an input side of said gearbox.

3. A gearbox assembly according to claim 1, wherein said at least one support bearing assembly comprises one of a 4-point contact angular ball bearing and a deep-groove ball bearing.

4. A gearbox assembly according to claim 1, wherein said output shaft is not supported at all by any bearing assembly on an output side of said gearbox.

5. A gearbox assembly according to claim 1, wherein said fixing part of said coupling comprises a flange which abuts said gear assembly, and abuts an end face of said hub on an output side of said gearbox.

6. A gearbox assembly according to claim 5, wherein said flange is attached directly to said hub via one or more fasteners.

7. A gearbox assembly according to claim 1, wherein an open end of said gearbox housing on a coupling side of said gear assembly is covered by a cover which co-operates with said gear hub and said gearbox housing.

8. A gearbox assembly according to claim 1, wherein the coupling comprises an upper yoke which forms part of a Cardan shaft connection.

9. A gearbox assembly according to claim 1, wherein said coupling forms an integral part of said intermediate shaft to form an I-shaft.

10. A gearbox assembly according to claim 9 wherein said I-shaft forms an integral part of said gearbox assembly.

11. A gearbox assembly according to claim 1, wherein said hub is fixed to said output shaft by a locating means which comprises an interaction between part of said hub and a part of said output shaft.

12. A gearbox assembly according to claim 11, in which the locating means includes spline teeth which are incorporated into at least one of the connecting surfaces of said hub and said output shaft.

13. A gearbox assembly according to claim 11, wherein said locating means is a first locating means, and wherein a secondary locating means is provided which also comprises an interaction between part of said hub and a part of said output shaft.

14. A gearbox assembly according to claim 13, wherein said secondary locating means comprises a portion of said output shaft which has a nonround profile in cross section which co-operates with a corresponding non-round hole formed in a centre of a flange of said coupling.

15. A gearbox assembly according to claim 14, wherein a circlip is provided which fits at least partially within a groove provided in said non-round part of said output shaft.

16. A gearbox assembly according to claim 15, wherein when said circlip is rotated into position, said circlip is prevented from rotating out of its installed position by one or more flexible fingers radiating from a periphery of said circlip which are arranged so as to engage with depressions formed in an adjacent side of a Worm-Wheel Hub into which said fingers snap-fit on assembly and out of which they are prevented from subsequently disengaging by the presence of a flange once it is fixed to said hub.

17. A gearbox assembly according to claim 1, wherein relative rotational and axial movement between the hub and the output shaft is prevented by a grub screw that engages with a hole half-formed as a semicircular depression in an outside circumference of said output shaft and half-formed as a semi-circular depression in an inside circumference of said hub.

18. A gearbox assembly according to claim 17, wherein said grub screw is provided with a non-round head at its accessible end which provides a means for screwing it into position in said half-threaded hole which is created by the two semi-circular depressions.

19. A gearbox assembly according to claim 18, wherein said non-round head is engaged with a slot in a circumference of an inner bore of said flange once the latter is fixed in position against the Worm-Wheel hub such that the interaction between said slot and said head prevents further rotation of said grub screw.

20. A gearbox assembly for an electric power assisted steering assembly comprising:
    a gearbox housing,
    an output shaft,
    at least one support bearing assembly supporting the output shaft relative to the gearbox housing,
    a wheel gear assembly including a hub that is fixed to the output shaft so as to prevent relative rotational and axial movement therebetween and a gear wheel fixed to the hub,
    a worm gear engaging the gear wheel, and
    a coupling for transmission of torque from the output shaft to an intermediate shaft that is external to the gearbox housing, the coupling including a fixing part that is fixed to output shaft through the gear assembly and the support bearing assembly is provided on an opposite side of the gear assembly to the coupling such that the gear assembly is overhung from a portion of the output shaft supported by the support bearing assembly;
    wherein the hub is fixed to the output shaft by a locating means that includes an interaction between part of the hub and a part of the output shaft, and
    wherein the locating means includes spline teeth that are incorporated into at least one of the connecting surfaces of the hub and the output shaft.

* * * * *